May 4, 1943.　　G. J. WINTERMUTE ET AL　　2,318,568
HYDRAULIC LANDING GEAR
Filed March 15, 1940　　3 Sheets-Sheet 1

INVENTOR
GEORGE J. WINTERMUTE
DAVID E. BENCH
ATTORNEYS

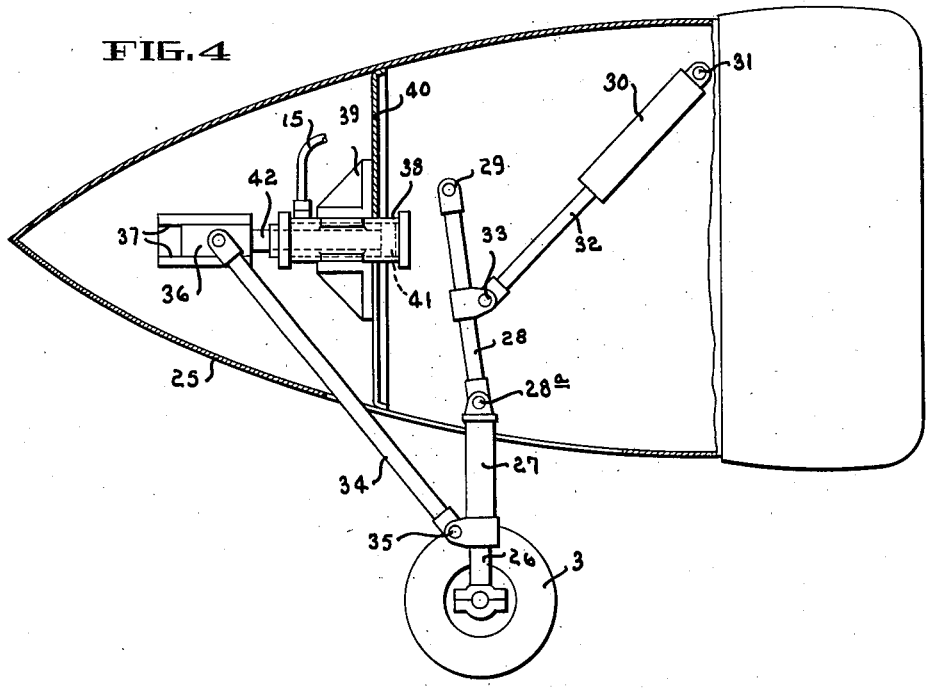
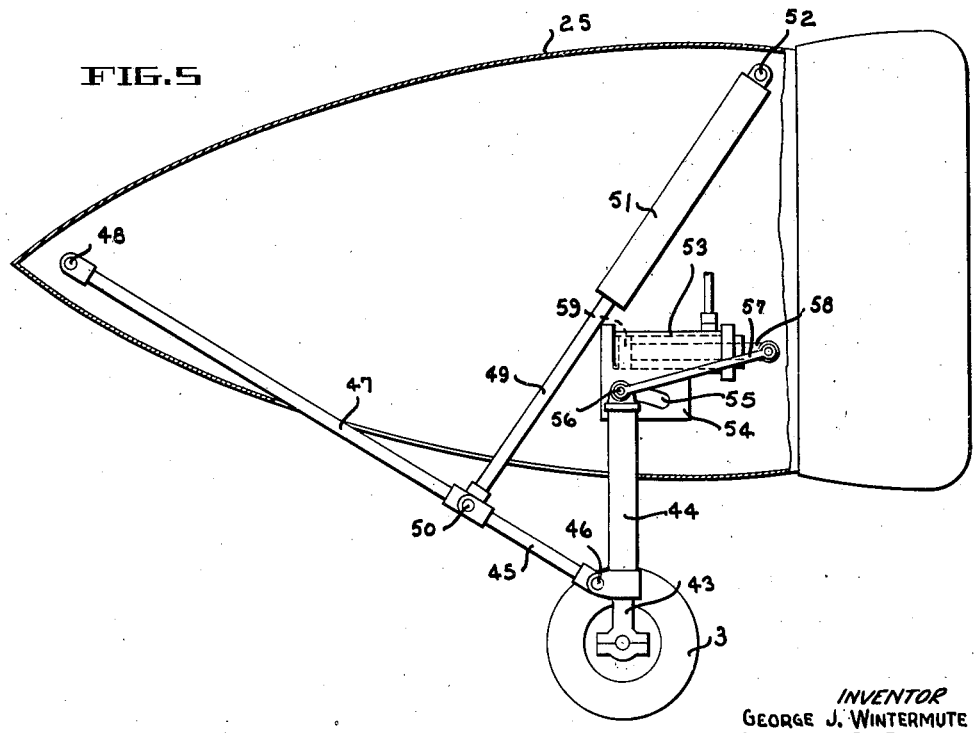

May 4, 1943.  G. J. WINTERMUTE ET AL  2,318,568
HYDRAULIC LANDING GEAR
Filed March 15, 1940  3 Sheets-Sheet 3
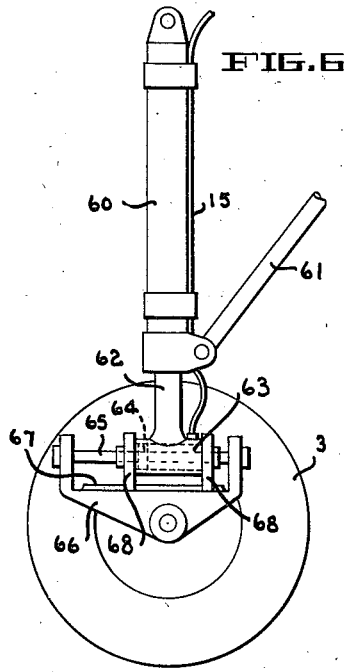
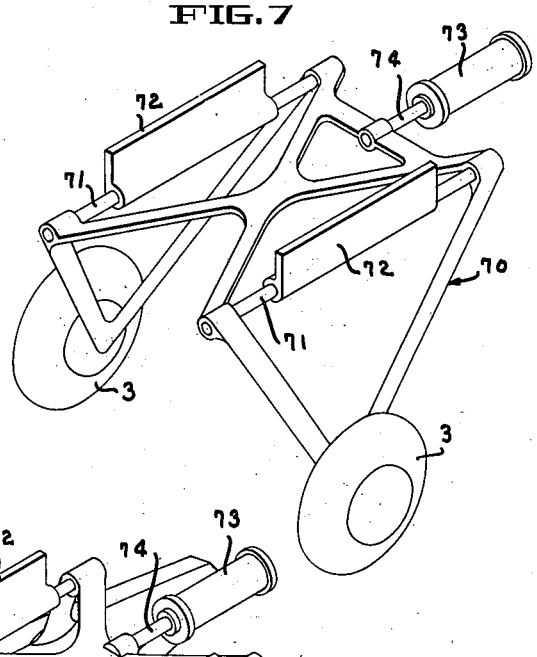
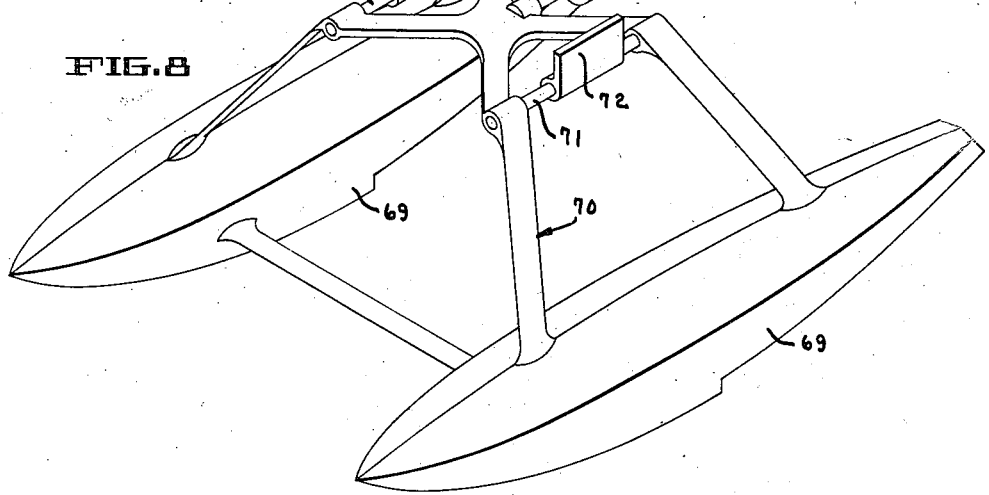
INVENTOR
GEORGE J. WINTERMUTE
DAVID E. BENCH
BY Toulmin & Toulmin
ATTORNEYS Patented May 4, 1943

2,318,568

UNITED STATES PATENT OFFICE 2,318,568

HYDRAULIC LANDING GEAR

George J. Wintermute and David E. Bench, Dayton, Ohio, assignors, by mesne assignments, to The Commonwealth Engineering Company of Ohio, Dayton, Ohio, a corporation of Ohio Application March 15, 1940, Serial No. 324,166

8 Claims. (Cl. 244—102)

This invention relates to airplane landing gears and more particularly to an airplane landing gear wherein provision is made for taking up horizontal shock imposed upon the landing gear during take-off, taxiing, and landing.

It is an object of the present invention to provide a landing gear which is adapted to take up horizontal shock imposed on it while the airplane is in contact with the earth.

Another object is to provide a landing gear of the foregoing type wherein provision is made for exclusively taking up horizontal shock, independently of the means conventionally provided for taking up vertical shock.

Another object is to provide a landing gear of the foregoing type wherein the landing gear is maintained solid until a horizontal shock of predetermined magnitude is imposed on it, whereupon it is adapted to yield and absorb this shock so as to prevent injury to the landing gear and to the airplane. Minor horizontal shocks do not cause undue injury to the airplane or the landing gear, but excessive horizontal shocks of great magnitude frequently cause injury to the landing gear and to the airplane itself, in some cases causing nosing over and other difficulties.

Another object is to provide a landing gear of the type described in the preceding object wherein the value of the horizontal shock which is required before the horizontal shock absorbing system is brought into action, is adjustable.

Still other objects will more fully hereinafter appear.

In the accompanying drawings;

Fig. 4 is a vertical longitudinal section through a retracting landing gear mounted in an outboard motor nacelle and equipped with horizontal shock absorber means involving the principles of the present invention.

Fig. 5 is a similar view of another type of retracting landing gear mounted in an outboard motor nacelle and embodying the principles of the present invention.

Figure 1:
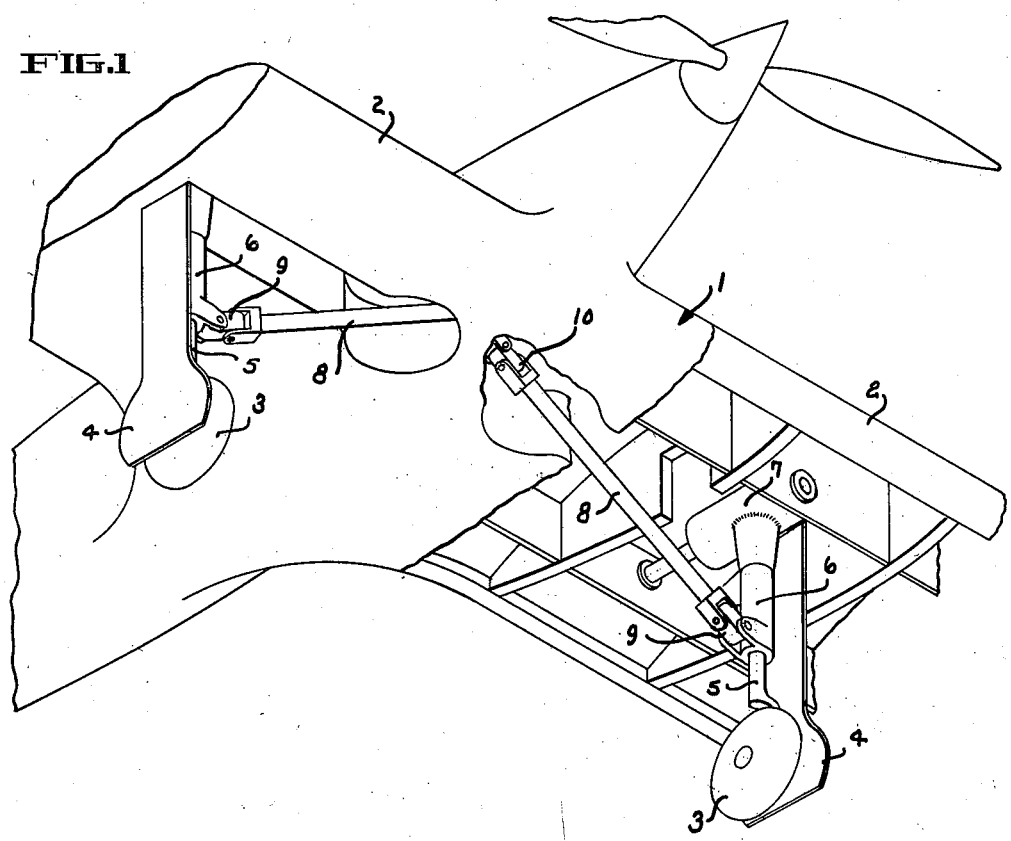
Fig. 1 is a bottom perspective looking rearwardly of an airplane equipped with a typical wing-enclosed retractable landing gear embodying one form of horizontal shock absorber of the present invention.

Fig. 6 portrays still another modification and is a side elevation of a landing wheel carried on a landing strut, the means for taking up horizontal shock being interposed between the conventional vertical shock absorber and the wheel axis.

Fig. 7 is a perspective of another form of the invention wherein the landing wheels are mounted on a carriage which is slidable fore and aft, the rearward movement of the carriage being restrained in accordance with the principles of the present invention.

Fig. 8 is a similar view of a pontoon type landing gear.

Referring to the drawings in detail, and first more particularly to Figs. 1 and 2, the airplane body 1 comprises the wings 2, below which are mounted the wheels of a retractable landing gear, these wheels being designated 3. The retractable covering for the wheels is designated 4. The wheels 3 are pivotally mounted at the lower end of wheel struts 5, which are telescopically mounted within a hollow strut 6, shock absorber means of the usual type being interposed between struts 5 and 6 and being adapted to normally push the wheel 3 downwardly but to yield in response to vertical shock so as to allow the wheel 3 to rise upwardly relative to the airplane 1. The vertical strut 6 is integrally attached to a horizontal hydraulic cylinder 7 which takes up horizontal shock and also serves as a hinge or pivot point for the landing gear during extension and retraction. The retraction mechanism is not shown in detail and, as will be understood, is of the conventional type. An inclined strut 8 is provided for supporting the landing gear downwardly during landing and take-off, this strut 8 being connected to the strut 6 through the intermediary of the universal joint 9 and being connected at its other end to the airplane 1 or suitable retraction mechanism through universal joint 10.

The hydraulic cylinder 7 is mounted for movement fore and aft relative to the airplane. This is effected by having the cylinder 7 slidably engage a piston 11. Integral with piston 11 is the longitudinally extending piston rod 12 which is fixedly carried by the spars 13 in the wing 2. The piston rod 12 is mounted so as to be substantially parallel to the plane of normal flight. It will be understood, however, that it may be mounted so as to be parallel to the earth during a three point landing, because it would still be substantially horizontal during take-off or landing with the tail up. The ends of cylinder 7 are closed by the caps 14 which are provided with the usual sealing glands for slidably engaging the piston rod 12 during a fore and aft movement of the wheel 3.

The wheels 3 and the cylinders 7 are normally urged to their forwardmost position, by reason of the maintenance of hydraulic pressure in the cylinder 7 ahead of the piston 11. Liquid under pressure is adapted to be supplied to this space from the conduit 15 which is in communication with a bore 16 in piston rod 12, this bore 16 being in communication with the space ahead of piston 11 by means of the right angle bore 17.

Figure 2:
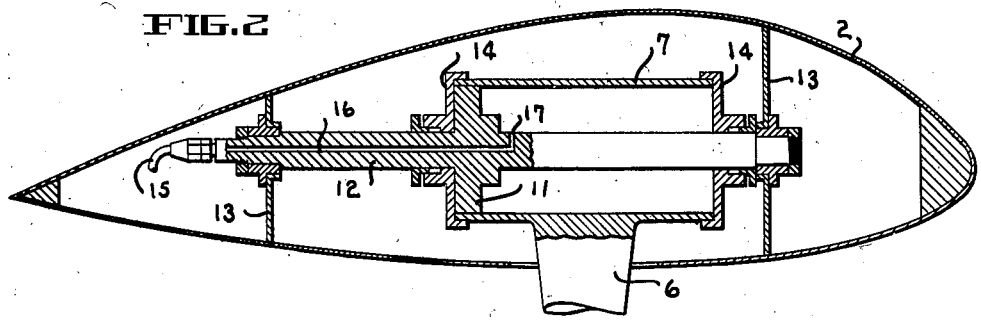
Fig. 2 is a longitudinal vertical section through a wing and the shock absorber cylinder of the aircraft of Fig. 1.
Figure 3:
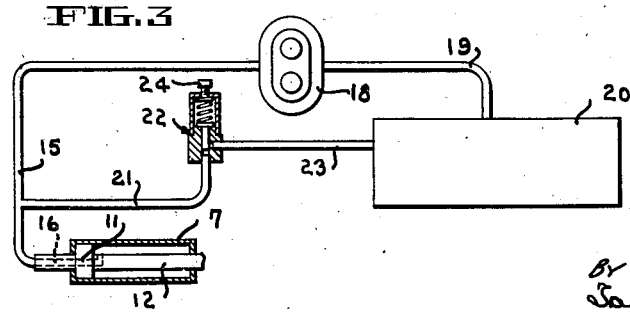
Fig. 3 is a diagrammatic view showing the hydraulic circuit employed in the system of Figs. 1 and 2; this view shows how the hydraulic liquid used for the actuation of the shock absorber is taken off of the pressure output line commonly provided in the modern airplane for the actuation of retraction mechanism, gun turrets, etc.

In Fig. 3, there is illustrated a typical mode of taking off pressure liquid from the hydraulic pump commonly supplied with the aircraft and thereby actuating the hydraulic cylinder 7 in the desired manner. The pump is designated as 18 and is of the one-way constant delivery type, such as a gear pump. It will be understood that if no pump is available on the aircraft for the operation of other hydraulic mechanisms, one must be provided for the system of Figs. 1 to 3. The pump 18 draws liquid by conduit 19 from a tank 20 and supplies it under pressure to the conduit 15 which is in communication with the space ahead of piston 11. After the cylinder 7 is moved all of the way forward, the output of the pump 18 is by-passed through a conduit 21, a relief valve 22 and a conduit 23 to the tank 20. The relief valve 22 is provided with an adjusting means 24 for adjusting the point at which by-passing occurs and at which liquid is allowed to pass from the interior of cylinder 7 through the relief valve 22.

The operation of the embodiment of Figs. 1 to 3 is as follows:

The cylinder 7 and the wheel 3 are maintained at their forwardmost position shown in the drawings by reason of the pressure supplied by pump 18, this pressure being by-passed through relief valve 22 after the piston 11 bottoms in the cylinder 7. Should a small horizontal shock tending to move the wheel 3 rearwardly be encountered, it will have no effect, the system remaining solid. However, should a horizontal shock of magnitude equal to or greater than that required to move the cylinder 7 rearwardly and cause discharge of liquid therefrom through the relief valve 22 be encountered, the cylinder 7 will be forced rearwardly and will thus allow wheel 3 to be moved rearwardly. Immediately upon the removal of this shock, the relief valve 22 will close and the output of pump 18 will be effective to return the cylinder 7 and the wheel 3 to their forwardmost positions. During take-off, vertical shocks are separately taken care of by the conventional vertical shock absorber system provided within the strut 6. The universal joints 9 and 10 allow the movement of the wheel 3, the struts 5 and 6 and the cylinder 7 fore and aft, relative to the air plane 1.

If it is desired to change the magnitude of horizontal shock required to move the wheel 3 rearwardly, this can be effected by adjusting the set screw 24 so as to change the pressure at which relief valve 22 will operate.

*Modification of Figure 4*

In this modification, the wheel 3 is carried in the engine nacelle 25 and is retractable upwardly thereinto. The wheel is mounted on the lower end of a strut 26 which operates telescopically within the vertical shock absorber cylinder 27 which contains the usual mechanism for normally urging the wheel 3 downwardly and for allowing it to rise upwardly in response to vertical shock. The cylinder 27 is pivotally attached at 28a to the lower end of a link 28 which is pivoted to a fixed part of the airplane at 29. A hydraulic retraction cylinder or "jack" 30 of the usual type is provided for extending and retracting the wheel 3, this cylinder being pivoted at a fixed part of the airplane at 31 and being provided with the telescoping link 32 which is pivoted to the link 28 at 33. This is a conventional type of retraction mechanism, the extension of link 32 causing links 28 and 27 to form in effect a single rigid link. An inclined strut 34 is pivoted at its forward end at 35 to the shock absorber cylinder 27 and at its rear end to a longitudinally slidable block 36 which operates between the guides 37.

The horizontal shock absorbing system comprises the hydraulic shock cylinder 38 fixedly mounted with respect to the nacelle 25 as by means of the bracket 39 attached to the nacelle partition 40. Slidably disposed within the cylinder 38 is the piston 41 which is rigidly connected to the block 36 by the piston rod 42. Hydraulic liquid under pressure is supplied by conduit 15 which is attached to cylinder 38 and which delivers liquid into the space behind piston 41, the arrangement shown constituting an inversion of the arrangement of Figs. 1 to 3 wherein the piston was fixed and the cylinder movable.

The operation of the device of Fig. 4 is substantially the same as that of the device of Figs. 1 to 3, the horizontal shock imposed upon wheel 3 being transmitted to the piston 41 and when it exceeds a certain value, forcing piston 41 rearwardly in the stationary cylinder 38. The vertical shock is taken up independently by the vertical shock absorber 27. The pivot 28a allows fore and aft movement of the wheel 3.

*Modification of Figure 5*

In Figure 5, the wheel 3 is mounted on a wheel strut 43 which is telescopically associated with a vertical shock absorber cylinder 44. A link 45 is pivotally attached at 46 to the lower end of cylinder 44. A link 47 pivotally engaging the nacelle 25 at 48 cooperates with the link 45 to hold the pivot point 46 against fore and aft movement. Links 47 and 45 are pivoted to one another and to a retraction link 49 at the pivot point 50. The retraction link 49 telescopically operates within the retraction cylinder 51 which is pivoted to the engine nacelle at 52. The foregoing constitutes a conventional retractable landing gear.

Provision of taking up horizontal shock imposed on wheel 3 is as follows:

The horizontal shock absorbing cylinder 53 is fixedly mounted with respect to the airplane in any suitable manner and in a substantially horizontal plane. Fixedly carried by cylinder 53 in any suitable manner is the guide plate 54 which has a slot 55 guiding the pin 56 mounted at the upper end of shock absorbing cylinder 44. A link 57 is pivoted at one end to the piston rod 58 of the piston 59 and at the other end is connected either pivotally or fixedly to the pin 56.

Thus, as a rearwardly directed horizontal shock is imposed on wheel 3, the pin 56 tends to move forwardly and this tends to move the piston 59 forwardly in cylinder 53 and thereby to force pressure liquid from the space in front of piston 59 outwardly through the supply conduit 15 which is connected to a pump and relief valve in the same manner as that shown in Fig. 3.

Modification of Figure 6

In Fig. 6, there is portrayed a modification wherein the horizontal shock absorber means is mounted between the vertical shock absorber means and the wheel axle, the horizontal shock absorber mechanism adding to the unsprung weight of the landing gear. The conventional vertical shock absorber cylinder 60 is pivoted or fixedly attached in any suitable manner at its upper end to the airplane body and may be additionally supported by the rearwardly extending strut 61. Telescopically operating within the cylinder 60 is the strut 62 which is prevented in any suitable manner from rotating relative to the airplane. Integrally carried at the lower end of strut 62 is a horizontal shock absorbing cylinder 63 within which is adapted to operate the hydraulic piston 64. Piston 64 is integral with a plunger or piston rod 65 which is fixedly attached in any suitable manner to the yoke 66 which carries the wheel 3 in any suitable manner. Integrally formed on the upper inner face of the yoke 66 is a longitudinal guide flange or spline 67 which slidably engages corresponding slots formed in the guiding ears which are downward extensions of the caps 68 of the cylinder 63. These guiding ears and the spline or flange 67 cooperate to prevent rotation of the wheel about the axis of plunger 65. The pressure liquid is supplied to the space behind piston 64 by means of the flexible conduit 15 which extends along the shock absorbing strut 60 into communication with the interior of cylinder 63.

From the foregoing, it will be seen that a rearwardly directed horizontal shock upon the wheel 3 will tend to urge the piston 64 rearwardly into the cylinder 63, tending to expel the liquid outwardly through the supply conduit 15. The hydraulic connections are the same as those shown in Figure 3 above.

Modification of Figures 7 and 8

In these modifications, the landing members such as the wheels 3 or the pontoons 69 are fixedly attached in any suitable manner to a carriage 70 which is provided with longitudinally extending rods 71 which extend slidably through flanged supports 72 which are attached in any suitable manner to the airplane body. Thus, the carriage 70 is freely slidable longitudinally with respect to the airplane body except for the restraint afforded by the horizontal shock absorbing system presently to be described. This system comprises a horizontally disposed hydraulic cylinder 73 which is fixedly attached in any suitable manner to the airplane so as to be restrained against longitudinal movement relative thereto. Cylinder 73 contains a hydraulic piston which is integral with or fixedly attached to a plunger or piston rod 74 which is fixedly attached at its forward end to the carriage 70 in any suitable manner. Instead of a single hydraulic cylinder and piston, a plurality may be provided. If desired, a shock absorbing cylinder corresponding to 73 may be mounted ahead of the carriage 70 and provided with a piston which is supplied with hydraulic liquid. The hydraulic shock absorbing cylinder 73 is supplied with hydraulic liquid behind the piston of its cylinder in the same manner as that described above.

The operation of the modifications of Figs. 7 and 8 will be obvious from the foregoing. Should a horizontal shock of undue magnitude be encountered, the landing gear and carriage 70 will move rearwardly, the piston in cylinder 73 expelling the liquid therefrom in the same manner as is described above.

It will be seen from the foregoing that the present invention provides for the attainment of the objects set out above, in a simple and economical manner. The invention brings about these results in a highly effective manner. By segregating the absorption of horizontal shock from the absorption of vertical shock, these shocks are taken care of independently, and the ratio of their magnitudes may be varied widely. Thus, there is no fixed ratio between the horizontal and vertical components of a given angularly directed shock, and there is no change in the possible ratio depending upon the extent of compression of the vertical shock absorbing system. Where reference is made herein to "substantially horizontal," it is to be understood that this comprehends disposition substantially parallel to the line of flight or substantially parallel to the ground, the present invention providing mechanism exclusively directed to the absorption of shocks which are substantially parallel to the ground either in landing or take-off.

We wish it to be understood that numerous modifications may be made from the embodiments shown in the drawings without departing from the spirit of the invention. For example, the horizontal shock absorbing systems shown may be replaced by systems which are not solid up to a certain point but which allow the landing gear to yieldingly move fore and aft during the landing or take-off. This result might be accomplished by adjusting the relief valve 22 so as to allow the motive element of the shock absorbing cylinder to travel in such direction as to allow the landing member to move rearwardly under the influence of practically any horizontal shock.

The same result may be accomplished by replacing the hydraulic mechanism shown with any conventional shock absorbing system, such as an oleo strut, which is adapted to urge the landing member forwardly at all times but to yieldingly allow it to be moved rearwardly under the influence of horizontal shocks. Similarly, other suitable shock absorber systems may be employed, such as springs, pneumatic shock absorbers, and the like. It is not necessary that the shock absorber for taking up horizontal shock be disposed horizontally provided it is so arranged by linkages or the like that rearward movement of the wheel tends to yieldingly move the motive element of the shock absorber in a direction opposite to that in which it normally tends to be urged. Modifications may be made in the hydraulic system shown. For example, a variable delivery pump may be substituted for the fixed delivery pump shown, provision being made for shifting this pump automatically to neutral upon the attainment of a predetermined pressure in the output line, a relief valve adapted to operate upon the attainment of a somewhat higher pressure than that required to shift the pump to neutral, being employed. Likewise, other methods of allowing relief of the hydraulic cylinder may be employed, such as a hydraulic accumulator or the like. These, and other modifications obvious to those skilled in the art are deemed to fall within the inventive spirit, and the invention is to be construed as limited only as defined in the appended claims.

Having thus fully described our invention, what we claim as new and desire to secure by Letters Patent is:

1. In an airplane, an airplane body, a landing member, means constructed and arranged for mounting said landing member upon said body so that said member is movable relative to said body in a plane substantially parallel to the longitudinal axis thereof, and hydraulic means having a constant resistance force connected with said mounting means for absorbing the forward velocity of said body upon initial landing contact of said landing member with the ground.

2. In an airplane, an airplane body, a landing member carried thereby, means constructed and arranged for mounting said landing member upon said body so that it is movable fore and aft relative to said body in a substantially horizontal plane, and hydraulic means having substantially constant pressure applied thereto for taking up rearwardly directed horizontal movement of said landing member to absorb forward velocity of said body upon initial landing contact of said landing member with the ground, said last-named means being solid to horizontal forward velocity of less magnitude than said pressure but yielding to horizontal forward velocity of a magnitude equal to or greater than said pressure.

3. In an airplane, an airplane body, a landing member carried thereby, means carried by said body for mounting said member on said body so that it is movable rearwardly relative thereto in a substantially horizontal plane, and hydraulic means having constant pressure applied thereto for resisting said movement to absorb a part of the forward velocity of said body upon initial contact of the landing element with the ground, said absorbing means remaining in full absorbing postion until the rearwardly acting force due to forward velocity of said plane is less than the pressure resisting said movement, and means for adjusting the value of said pressure.

4. In an airplane, an airplane body, a landing member carried thereby, means carried by said body for mounting said member on said body so that it is movable rearwardly relative thereto in a substantially horizontal plane, and hydraulic means having constant pressure applied thereto for resisting said movement to absorb a part of the forward velocity of said body upon initial contact of the landing element with the ground, said absorbing means remaining in full absorbing position until the rearwardly acting force due to forward velocity of said plane is less than the pressure resisting said movement.

5. In an airplane, an airplane body, a landing member carried thereby and mounted thereon so as to be movable fore and aft relatively thereto in a substantially horizontal plane, means interposed between said member and said body for resisting rearward movement of said member in response to a substantially horizontal shock comprising as elements a hydraulic cylinder and a hydraulic piston therein, one of said elements moving with said member as said member moves in said plane and the other of said elements being fixedly carried by said body, a hydraulic pump, means connecting the output of said pump to said cylinder on the side of said piston such that said output urges said member forwardly, and means connected to said connecting means for by-passing the output of said pump after a predetermined pressure is developed in said connecting means and for exhausting liquid from said cylinder at said predetermined pressure upon movement of said member rearwardly in response to a horizontal shock of a magnitude exceeding the force normally exerted on said piston by said output to prevent pressure build-up in said cylinder with consequent rebound of said member.

6. In an aircraft, a body, a landing member, means carried by said body and constructed and arranged for suspending said member from said body to permit independent vertical and horizontal movement thereof including means for absorbing vertical shock imposed upon said member and hydraulic means for maintaning a predetermined horizontal position of said member with respect to said body, means supplying fluid to said hydraulic means at substantially constant pressure, and exhaust means for said hydraulic means for collapsing of said hydraulic means against said constant pressure to absorb a part of the forward velocity of said plane without a pressure increase in said hydraulic means and consequent rebound thereof.

7. In an aircraft, a body, a landing member, means carried by said body and constructed and arranged for suspending said member from said body to permit independent vertical and horizontal movement thereof including means for absorbing vertical shock imposed upon said member and hydraulic means for maintaining a determined position of said member with respect to said body under all normal landing and taxiing loads, means supplying fluid to said hydraulic means at substantially constant pressure, and exhaust means for said hydraulic means for collapsing of said hydraulic means against said constant pressure to absorb a part of the forward velocity of said plane upon initial landing contact of said aircraft with the ground without a pressure increase in said hydraulic means and consequent rebound.

8. In an aircraft, a body, a landing member, means carried by said body and constructed and arranged for suspending said member from said body to permit independent vertical and horizontal movement thereof including means for absorbing vertical shock imposed upon said member and hydraulic means for maintaining a determined position of said member with respect to said body under all normal landing and taxiing loads, means supplying fluid to said hydraulic means at substantially constant pressure, and exhaust means for said hydraulic means for collapsing of said hydraulic means against said constant pressure to absorb a part of the forward velocity of said plane upon initial landing contact of said aircraft with the ground without a pressure increase in said hydraulic means and consequent rebound, said constant pressure acting upon said hydraulic means to return said hydraulic means to its predetermined horizontal position with respect to said body when the force of forward velocity of said body is less than said pressure.

GEORGE J. WINTERMUTE.
DAVID E. BENCH.